United States Patent
Stein

(10) Patent No.: US 10,650,361 B2
(45) Date of Patent: May 12, 2020

(54) METHOD AND SYSTEM FOR ANALYZING COPYRIGHT INFORMATION IN A MIXED LONG-FORMAT AUDIO FILE

(75) Inventor: David Stein, Brooklyn, NY (US)

(73) Assignee: Dubset Media Holdings, Inc., New York, NY (US)

( * ) Notice: Subject to any disclaimer, the term of this patent is extended or adjusted under 35 U.S.C. 154(b) by 1013 days.

(21) Appl. No.: 13/475,823

(22) Filed: May 18, 2012

(65) Prior Publication Data

US 2012/0323800 A1    Dec. 20, 2012

Related U.S. Application Data

(60) Provisional application No. 61/487,651, filed on May 18, 2011, provisional application No. 61/639,066, filed on Apr. 26, 2012.

(51) Int. Cl.
G06Q 20/12       (2012.01)
G06F 21/10       (2013.01)

(52) U.S. Cl.
CPC ......... *G06Q 20/1235* (2013.01); *G06F 21/10* (2013.01); *G06Q 2220/10* (2013.01); *H04L 2463/103* (2013.01)

(58) Field of Classification Search
CPC .................. G06Q 20/00–425; G06F 21/00–88
USPC ................................................... 705/50–500
See application file for complete search history.

(56) References Cited

U.S. PATENT DOCUMENTS

| | | | | |
|---|---|---|---|---|
| 5,892,900 | A * | 4/1999 | Ginter | G06F 21/10 726/26 |
| 6,697,948 | B1 * | 2/2004 | Rabin et al. | 726/30 |
| 7,065,287 | B1 * | 6/2006 | Heredia | G11B 19/02 348/E5.002 |
| 7,085,613 | B2 * | 8/2006 | Pitman et al. | 700/94 |
| 2003/0229537 | A1 * | 12/2003 | Dunning et al. | 705/10 |
| 2008/0114665 | A1 * | 5/2008 | Teegarden | 705/26 |
| 2011/0015968 | A1 * | 1/2011 | Carlson | 705/10 |

* cited by examiner

*Primary Examiner* — Mohammad A. Nilforoush
(74) *Attorney, Agent, or Firm* — Hogan Lovells US LLP

(57) ABSTRACT

A computer-implemented system for analyzing copyright right ownership of a media content containing one or more copyrighted works, comprising the steps of: receiving, by a controller having a CPU, a media content from a first user via a wide area network, the media content comprising a mix of copyrighted works; parsing the media content into a format recognizable by a fingerprinting analytical algorithm; determining by the controller using the fingerprinting analytical algorithm copyright ownership information in the received media content; monitoring by the controller a playing of a select length of the media content from the content storage device by a second user; and reporting to a system operated by a copyright licensing entity by the controller the copyright ownership information associated with the select length of the media content played by the second user.

3 Claims, 3 Drawing Sheets

METHOD AND SYSTEM FOR ANALYZING COPYRIGHT INFORMATION IN A MIXED LONG-FORMAT AUDIO FILE

RELATED APPLICATION

The present application claims priority to the U.S. Provisional Patent Application No. 61/487,651, filed on May 18, 2011, and U.S. Provisional Patent Application No. 61/639,066, filed on Apr. 26, 2012, the contents of each of the aforementioned applications are incorporated herein by reference in their entirety.

FIELD OF INVENTION

The invention relates generally to the digital rights management of media contents, and more specifically, to media contents such as, for example, DJ mixes having mixed, overlapping music tracks from distinct copyright owners.

BACKGROUND OF THE INVENTION

With the advent of digital processing technology, users can now easily combine, compile or mix media contents of different origins to achieve a unique and desired effect. This compilation or mix attains its unique identity or personality through an artist's creative selection and blending of media contents. Typically, the selection is based on contents of shorter duration but have the appropriate characteristics or elements (e.g. tempos) for blending so as to create an integral mix that is varied, but yet imparts a particular mood collectively.

The ease of access to the digital processing technology has created myriad issues for both the copyright owners, the artists who created such compilations, as well as the consumers (e.g. listeners). For example, in a DJ mix (i.e., a sequence of musical tracks typically mixed together to appear as one continuous track), there are multiple copyright owners of the different tracks or samples contained in the mix but the determination of who the copyright owners are and the specific licensing requirements can be a daunting task. There are available fingerprinting tools, but such tools are not particularly suited to deal with a compilation such as a DJ mix in which the segment where the blending of different distinct copyrighted works occurs can confuse such tools.

Accordingly, there is a need for a computer system that provides a framework within which a compilation, such as a DJ mix, can be distributed, streamed or otherwise broadcast via, for example, the Internet in a way that is compliant with the applicable copyright laws and standards. Without this framework, in order to share or publish his/her mix, a DJ may simply upload the entire mix to a generic audio streaming service, which is not supported by any copyright tracking and reporting framework. As a result, the mix may be pinpointed by copyright licensing authorities and taken down from the internet.

SUMMARY OF THE INVENTION

An object of the invention is to successfully parse a compilation of mix into its individual copyrighted components.

Another object is to provide to the compiler or DJ easy-to-use tools to edit, correct and verify the component breakdown of his mix in order to ensure the accuracy thereof. With this detailed breakdown data of a DJ mix available, intervals of listener playtime can be associated with the songs within the mix that have been traversed or otherwise consumed. Furthermore, the tools provided to the DJ provide the ability to define overlapping timeframes for the individual songs in a mix. This capability not only aligns with the mixing and matching nature of a DJ mix, but also allows this framework to accurately track playtime for multiple overlapping song components within a timeframe. As a result, the listening history data acquired conforms to the compositional nature of a long-form DJ mix and provides an accurate solution for parsing and tracking the individual song components which comprise each mix. This listening history data can then be aggregated into formatted reports for monthly submission to copyright licensing entities such as BMI$^{SM}$ and SoundExchange$^{SM}$, which makes the listening experience fully compliant with a distributor's scope of license.

By providing a method for ensuring an accurate listing of a mixes' song components and monitors to track listener consumption of published mixes, plays of each song can be accurately tracked and reported to the necessary digital music rights organizations.

Thus, the inherent format of a DJ mix, as a composition composed of parts of individual songs, leads to particular challenges regarding digital rights management that are often overlooked. Songs within a DJ mix are often mixed together and layered leading to overlaps in song components, which must still be identified correctly in order to properly report song plays. In order to ensure accuracy, multiple sources of data are provided, which contribute to an accurate song breakdown for each mix. Furthermore, to accommodate for the mixing and matching nature of long-form DJ mixes, the ability to define and store overlapping song timestamps is provided to the DJ by the inventive system so that the song breakdown can be tailored to accurately represent each mix. After an accurate song breakdown (or tracklist) has been compiled and verified, the History Reporting library and algorithm ensures that listener playtime is accurately tracked and stored for each mix. The necessary data is then available for Reporting scripts to cross-reference mix and play history data in order to generate monthly reports for consumption by the relevant digital rights licensing organizations such as SoundExchange$^{SM}$ and BMI$^{SM}$.

DETAILED DESCRIPTION OF THE PRESENTLY PREFERRED EMBODIMENTS

Figure 1:
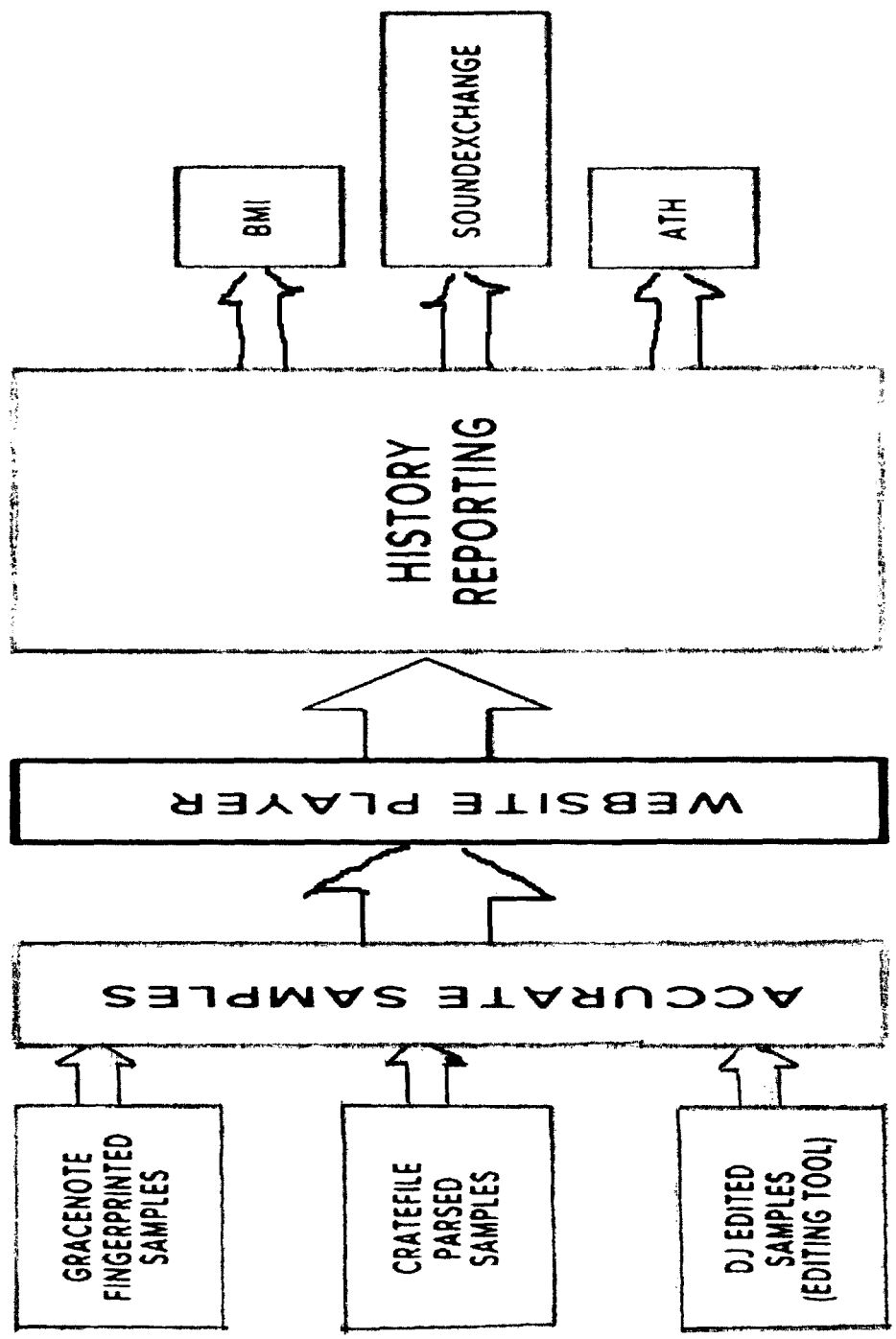
FIG. 1 is a schematic block diagram of certain elements of an exemplary embodiment of the present invention.

A. Glossary of Terminology (i) DJ mix/set: A longform music file, typically at least 30 min. in length that a DJ has composed or compiled from individual songs or musical tracks. Songs are often mixed and matched within a mix by the DJ, making the mix an individual composition in its own right.

(ii) Tracklist: A list of songs from which a mix is compiled. Typically includes information on the start time and end time of each of the songs in a mix.

(iii) Sample/track: An alternative term for an individual song in a mix. Tracklist is a breakdown of a mix's individual samples/tracks.

(iv) Cratefile: A text file containing tracklist information for a mix generated by Serato, a common software used by DJs to create DJ mixes.

(v) Record: An individual row in a table within a relational database (e.g. MySQL).

(vi) Document: An individual document in a table within the CouchDB database (which is non-relational, but revision based). This is consistent with standard terminology used in reference to non-relational databases.

(v) Gracenote fingerprinting: Gracenote provides technology to generate a unique fingerprint for an audio snippet and return song information from their database which matches the fingerprint.

B. Architectural Components

1. Computer Servers

The inventive system employs one or more computer servers, e.g., EC2 servers in the Amazon AWS service or any computer hardware with central processing units, memories and associated peripheral components, which host software program instructions for uploading, validating, and analyzing information and files from the users. The servers are connected to storage devices such as Amazon S3 storage and to various databases (e.g., Couch Database) to store large amounts of data related to mixes (mix metadata, tracklist information and user listening history reports). This data is later processed and used for communication with copyright licensing entities such as BMI$^{SM}$ and SoundExchange$^{SM}$. The server applications include editing tools accessible to users for verifying and editing their mix tracklists generated by the inventive technology.

2. Databases

A mix on the system interacts with two main databases via custom RESTful APIs:

Dubset DB (MySQL)

The Dubset database may be a relational database (e.g., MySQL) that stores all data relevant to the website and the users (e.g., DJs). The mix is stored along with relevant metadata such as the mix name, genre associations, DJ association, etc. It also stores along with each mix record a mixscan_id, which corresponds to the corresponding mix document stored in the MixSCAN database.

MixSCAN Data Base (CouchDB)

The MixSCAN database stores two types of documents, "mix" and "history" documents. Mix documents store only the samples information for tracklists. The format of these documents is shown below in the example document.

```
{ "_id": "mixZyNGiU", "_rev": "2-
43bc850d3fa7cfcb0bc56851fb478c99", "type": "mix", "createdAt":
1298187130293, "samples": [ { "startTime": { "msecs":
386500 }, "length": { "msecs": 2972 },
"best": { "id": "3798121", "ber": 0.336914,
"album": "The Ultimate Weapon", "artist": "", "title":
"College Park", "publisher": "Iris", "timeAt": {
"msecs": 154773 }, "length": { "msecs": 2972
} } }, // // More samples in ascending time series
order // ], "remote": "HTTP URL to this mix in Rackspace
Cloudfiles", "file": "Base filename of this mix in Rackspace Cloudfiles",
"updatedAt": 1298187130296 }
```

Each history document corresponds to 30 seconds of mix play per listener. History documents are optimized or otherwise designed to include the least amount of information possible in order to minimize the size of the requisite database.

The key information here is:

userId (if any): No userId will be stored for anonymous listening. This is a foreign key to the Dubset.com userId in MySQL mixId: Id of the Mix listened to.

date: System time (ticks since 1970 epoch) when the mix was listened to.

startTime: Start time in the mix (in milliseconds) that was listened to.

endTime: End time in the mix (in milliseconds) that was listened to.

{"_id": "mixzzpm7w1321023131", "_rev": "1-059e7b331bb4949d52a48f709ea9f1a0", "type": "history", "date": "1321023131423", "mixId": "mixzzpm7w", "startTime": "330036.8347167969", "endTime": "359916.4123535156", "userId": "null"}

C. Algorithm

The inventive system's main components and their interactions are illustrated by the block diagram in FIG. 1. Three sources of song breakdowns (aka samples) are provided for ingestion by the system:

(i) Gracenote Fingerprinted Samples
(ii) Cratefile Parsed Samples
(iii) DJ Manually Edited Samples These three sources are combined to produce an accurate samples list that represents the song components present within the given DJ mix. This representation is provided to the website player, via which users listen to mixes. The History Reporting library uses tailored event monitors to bind to player events, using a bucketing and thresholding algorithm to accurately track listener playtime for each mix. Accurate samples and listener playtime data are both stored in the database for later ingestion by Report Aggregation scripts, which cross-reference the necessary documents to generate formatted monthly reports for SoundExchange$^{SM}$ and BMI$^{SM}$.

Figure 2:
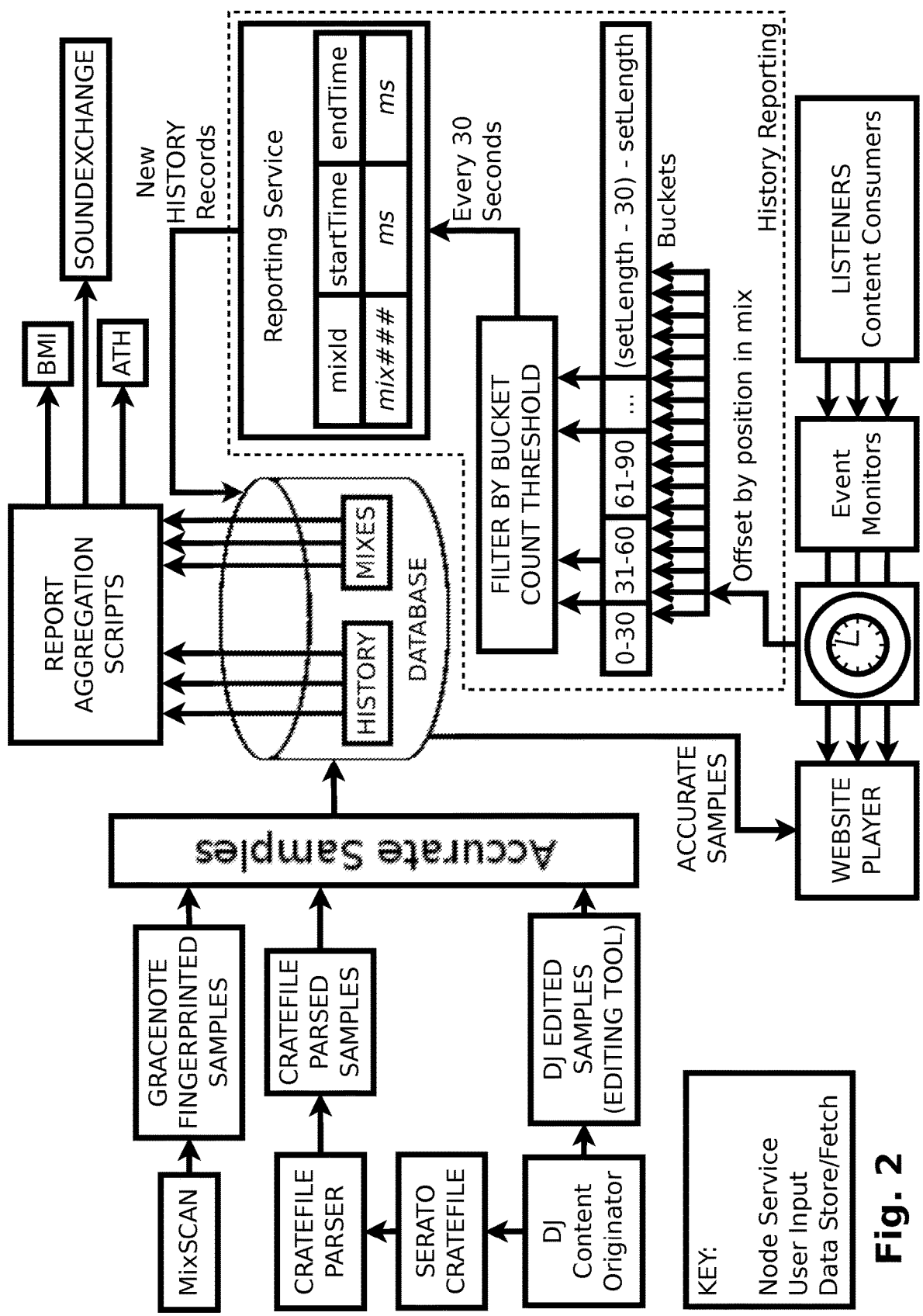
FIG. 2 is an overview of the inventive system for determining copyright information of a mix media content and for reporting usage of such content.

FIG. 2 below illustrates a more in-depth technical view of the lifecycle of a mix within this system from DJs as the content originators to listeners as content consumers to the final production of monthly play reports for digital rights organizations.

The following components are covered in detail in this document: (1) Ingestion Cycle, (2) Listening History Reporting, and (3) Monthly Report Generation.

1. Ingestion Cycle

The inventive system uses a series multiple, tiered points of contact to ensure 100% accuracy for any uploaded mix. Methods involve algorithmic fingerprinting, metadata parsing tools, and manual editing. Combined, these tools collaborate to generate a proprietary format we can use for reporting.

1.1 Gracenote$^{SM}$ Fingerprinting

The inventive system uses an asynchronous HTTP server built on top of the Gracenote$^{SM}$ platform to fingerprint long form content. The server is responsible for responding to incoming requests and processing the data offline. While content is running through the Gracenote$^{SM}$ SDK, the system lexes and parses the response to store all recognized samples with their associated start and end times in the long form content. To do this, the system sends a set of samples to the Gracenote^SM platform every 3 seconds for recognition. When Gracenote^SM responds with a match, the inventive system analyzes the results to determine if the song has changed.

1.2 Cratefile Parsing

An uploader can upload cue sheets generated by the program that created their mix for better accuracy. For instance, a cratefile generated by Serato^SM. These files are run through additional parsing tools to take the exact track list and amend the data generated by the initial fingerprinting analyses. Other formats or applications such as Traktor^SM or iTunes^SM may also be used.

1.3 Manual Editing

Figure 3:
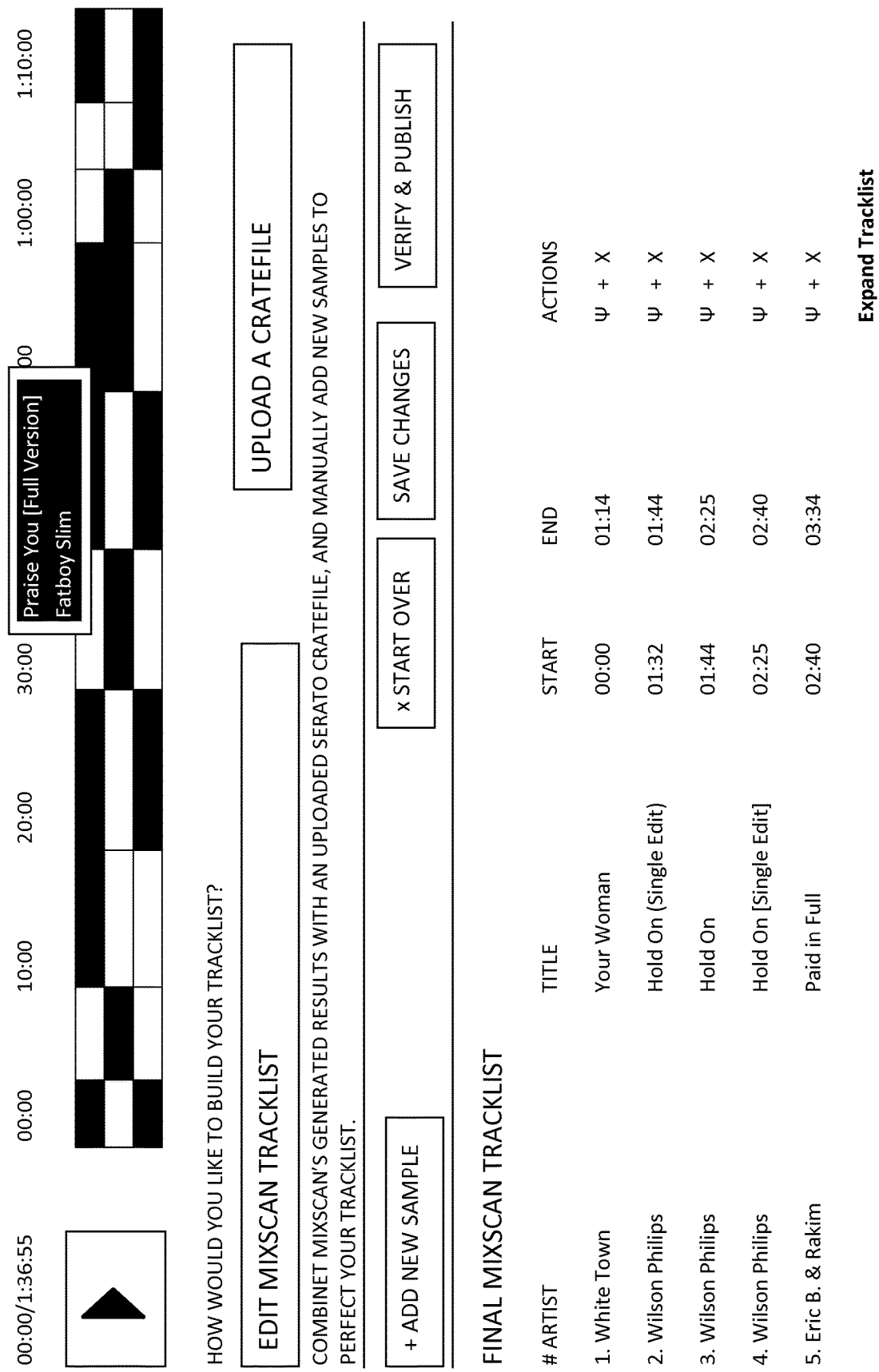
FIG. 3 is an exemplary editing tool for a creator of the mix media content.

All of the dynamic data described above can be adjusted and corrected using a custom tool used to visualize, and modify samples in long form content (see FIG. 3). This provides the user with the ability to adjust specific details which can't be fingerprinted by the algorithm commonly used by DJs; tracks which have been played at the same time, or modified in any way.

2. Listener History Reporting

The inventive system's client-side reporting algorithm is used to passively monitor listening patterns throughout a user's session on any device that is capable of reporting to the system's reporting server. All devices enables by the inventive system must abide by these guidelines in order to be compliant with the system's reporting service.

The client-side reporting service relies on bucketing player progress data points in order to efficiently track user listening patterns and properly report these statistics to our backend reporting service. There are 3 constants that can be manipulated in order to create a unique reporting experience. Changing any of these constants will have an effect on the granularity of the overlay report for mixes.

Configurable Constants:
  (i) REPORT_BUCKET_SIZE: The size (in milliseconds) of a reporting bucket.
  (ii) PLAYER_PROGRESS_INTERVAL: The time between player progress events in milliseconds.
  (iii) REPORT_THESHOLD: The minimum number of positions tracked within a bucket in order for a valid report call to be fired. A position is tracked every PLAYER_PROGRESS_INTERVAL.

Setting the Reporting Threshold

If our REPORT_BUCKET_SIZE is 30,000 ms and our PLAYER_PROGRESS_INTERVAL is 100 ms and we want to make sure a call is fired if the user listened to more than 3000 ms within a REPORT_BUCKET_SIZE than we should set REPORT_THESHOLD to 30. This means that we need at least 30 tracked positions within a bucket for the bucket to count as a valid "listen". This number is calculated by figuring out the number of progress events that will be recorded per second of mix play multiplied by the number of seconds needed for a bucket report.

(1000/REPORT_PROGRESS_INTERVAL)*(minimum progress time in seconds)

3. Events

There are four (4) key events that any client-side reporting service should subscribe to. These events dictate the loading of mix data, tracking play progress and cleaning up after a mix has finished playing or has been replaced by another mix.

loaded When a new mix is loaded into a player. The mixscan_id for that mix should be stored for reference when firing off report calls and the report buckets MUST be generated for the mix. At this point the service SHOULD bind itself to the player's progress event.

progress On each player progress event, the reporting service MUST compute the bucket index, track the current progress event and fire off a reporting call if the current bucket window has changed.

unloaded When a mix is unloaded, the reporting service MUST report the current bucket window if its above the threshold. At this point the service SHOULD unbind itself from the player's progress event.

finished When a mix is finished, the reporting service MUST report the current bucket window if its above the threshold. At this point the service SHOULD unbind itself from the player's progress event.

4. Generating the Report Buckets

The report buckets are created by calculating the number of buckets needed to store data points for every progress event within a mix. The number of buckets is calculated by dividing the mix length (in milliseconds) by the REPORT_BUCKET_SIZE and then rounding that number up to the nearest integer. Each bucket is then initialized to an empty array.

```
var mixLength = this.currentMix.getLength( ) // mix length in seconds
var numBuckets = Math.ceil(mixLength /
this.REPORT_BUCKET_SIZE) this.buckets = { };
for(var i=0; i < numBuckets; i++) {
    this.buckets[i] = [ ];
}
```

4. Handling a Progress Event

On each progress event a bucket MUST be calculated and the current progress position added to that bucket.

```
var index = Math.floor(position / this.REPORT_BUCKET_SIZE);
this.buckets[index].push(position);
```

4.1 Firing a Report Call

In order to figure out when to fire off a report call the current bucket must be tracked during mix play. If the newly calculated bucket index!=the current bucket index, we have left a bucket window which means a report event MUST be triggered if the buckets data points are above the REPORT_THESHOLD.

if (this.currentBucketIndex!=index) {this.report(this.currentBucketIndex); this.currentBucketIndex=index;}

4.2. Sending a Report

The reporting call has 4 required attributes and 1 optional attribute.

mixId The mixscan_id associated with the report
date The timestamp for the report
startTime The first progress offset within a bucket. This is the offset in milliseconds from the beginning of the mix of the initial progress event within the bucket.
endTime The last progress offset within a bucket. This is the offset in milliseconds from the beginning of the mix of the last progress event within the bucket.
user Metadata about the current user who is listening to the mix.

A report call is triggered for a given bucket index. When triggered, the current bucket is checked to see if meets the threshold requirements. If so, the above data is collected and sent over to the mixscan reporting service.

```
var bucket = this.buckets[currentBucketIndex];
startTime = bucket[0];
```

```
        endTime = bucket[bucket.length − 1];
        numPosition = bucket.length;
        if (numPosition >= this.REPORT_THESHOLD) {
            var data = {
                mixId: mixId,
                user: user,
                date: +new Date( ),
                startTime: startTime,
                endTime: endTime
            };
            post(url, data);
        }
        // Reset the bucket to its empty state.
        this.buckets[currentBucketIndex] = [ ];
```

5. Monthly Report Generation

The library used is built on Node.js and contains scripts for the generation of monthly aggregate tuning hours (ATH) and song-play reports for BMI[SM] and SoundExchange[SM].

5.1 Overview of History Aggregation Algorithm

Mix and history documents in the MixSCAN data base are cross-referenced to normalize plays information by sample ID. Corresponding subsets of a mix's samples are pulled according to the start and end timestamps stored in each history document. Play counts are then recorded for each sample in this subset. It is important to note that since plays information is generated via this cross-referencing and normalized by sample ID, overlapping samples in a time series will generate a correct play report for both samples.

5.2 Generation & Formatting

Reports are generated first for each day of the month by reading through all history documents created between the start and end of each respective day (i.e., a "daily"). These "dailies" are then aggregated into a monthly report. Raw aggregated data is written in JSON format to a "raw report" file along with the Aggregate Tuning Hours metric. Bin scripts to generate BMI[SM] and SoundExchange[SM] reports call upon custom formatters to process the monthly data and generate text files formatted for consumption by BMI[SM] and SoundExchange[SM], respectively in their standardized formats.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer-implemented method of determining a breakdown and usage of samples of copyrighted music in a media content file containing a mixture of overlapping samples of copyrighted music, comprising:
   receiving by a controller a media content file containing the mixture of samples of copyrighted music, at least two or more of the samples being overlapping;
   parsing by the controller the media content file into a format recognizable by a fingerprinting analytical algorithm;
   analyzing the parsed media content file by a fingerprinting server using the fingerprinting analytical algorithm to determine a breakdown of copyright ownership information of the samples in the parsed media content file;
   defining and storing a tracklist including the determined breakdown of the samples in a database;
   monitoring and reporting by a client reporting service in a player playing of each of the samples of the copyrighted music in the media content file by the player; and reporting by the controller to a system operated by a copyright licensing entity the copyright ownership information associated with the samples of the copyrighted music in the media content file played by the player.

2. The method of claim 1, wherein parsing the media content file into the format recognizable by the fingerprinting analytical algorithm comprises parsing predefined intervals of the media content file, wherein each of the predefined intervals is three seconds.

3. The method of claim 1, wherein the fingerprinting analytical algorithm is provided by Gracenote[SM].

* * * * *